R. F. Moore,
Nozzle,
No. 60,036. Patented Nov. 27, 1866.
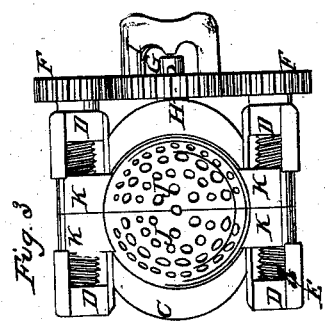
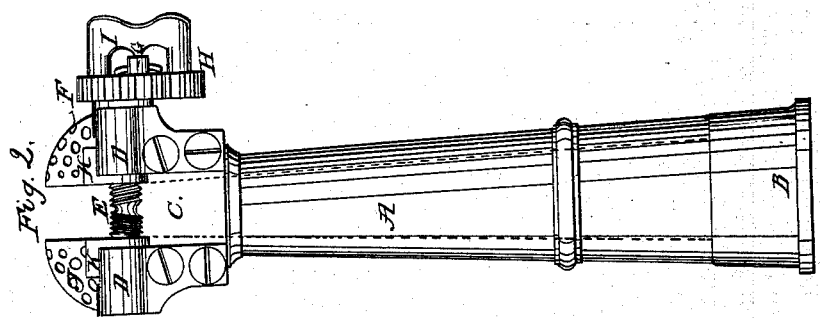
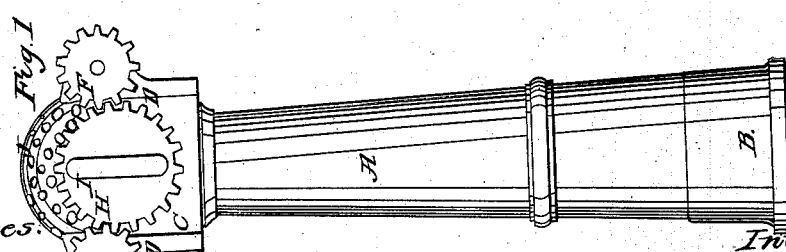
Witnesses:
Inventor:
Robert F. Moore,
By his Atty. J. Dennis Jr

United States Patent Office.

IMPROVEMENT IN NOZZLES FOR HOSE PIPES.

ROBERT F. MOORE, OF MANCHESTER, NEW HAMPSHIRE.

Letters Patent No. 60,036, dated November 27, 1866.

SPECIFICATION.

TO ALL WHOM IT MAY CONCERN:

Be it known that I, ROBERT F. MOORE, of Manchester, Hillsborough county, State of New Hampshire, have invented certain new and useful improvements in Hose Pipes; and I do hereby declare the following description and accompanying drawings are sufficient to enable any person skilled in the art or science to which it most nearly appertains, to make and use my said invention or improvements, without further invention or experiment.

The nature of my invention and improvements consists in providing a hose pipe with a perforated movable cap so arranged as to convert a solid or single stream into a shower or sprinkle, at the pleasure of the operator, without stopping the flow of water; or a sprinkle into a solid stream with the same facility.

In the accompanying drawings—

Figure 1 is an elevation of my hose pipe.

Figure 2 is an elevation with the perforated cap open.

Figure 3 is a view of the end with the perforated cap closed.

In these drawings the nozzle of a hose pipe is represented at A, which may be made in the form shown, or in such other form as will answer the purpose, and provided with a female screw at the end B, to connect it to a longer pipe or hose for use. The interior of the nozzle is made to taper gradually from B to the opposite end, as shown in dotted lines in fig. 2. The end C of the nozzle is made square and large, as shown in the drawings, to form seats for the four stands or boxes D D, which are fastened to it by screws, as shown in the drawing. The journals of the screws, E E, are fitted to turn freely in the stands D D; and each screw has a gear, F, fastened to one end to turn it when required. The pivot or stud, G, is fastened in the side of the end or head, C, for the gear H to turn on, which gears into the gears F F to turn both of the screws E at the same time, the gear H being provided with a staple, I, by which it may be turned with the thumb and finger to operate the screws E E. The hemispherical perforated cap is made in two parts, J J, which are fitted to traverse on the end C, each part of the cap being provided with two lugs or ears, K K, with female screws fitted to the screws E E, one-half of each screw being made right-handed, and the other half left-handed, so that when they are turned in one direction they draw the two parts J J of the perforated cap together over the end of the nozzle, and convert a single stream into a shower or sprinkle without stopping the flow of water; and by turning the screws in the opposite direction the shower may be changed to a single stream.

In combination with a hose pipe or nozzle, I claim a perforated movable cap, made in two parts, and arranged to traverse on the end of a hose pipe or nozzle, substantially as described, to enable the operator to convert a single stream into a shower or sprinkle, and reconvert it to a single stream, without stopping the flow of water from the nozzle.

ROBERT F. MOORE.

Witnesses:
WATERMAN SMITH,
HENRY H. SCRIBNER.